United States Patent
Narasimhamurthy

(10) Patent No.: US 9,722,265 B2
(45) Date of Patent: Aug. 1, 2017

(54) PRESSURE-BASED LIQUID LEVEL DETECTION AND CONTROL FOR A FUEL CELL STACK ASSEMBLY

(75) Inventor: Praveen Narasimhamurthy, Vernon, CT (US)

(73) Assignee: Audi AG, Ingolstadt (DE)

( * ) Notice: Subject to any disclaimer, the term of this patent is extended or adjusted under 35 U.S.C. 154(b) by 958 days.

(21) Appl. No.: 13/261,225

(22) PCT Filed: Sep. 24, 2009

(86) PCT No.: PCT/US2009/005297
§ 371 (c)(1),
(2), (4) Date: Mar. 21, 2012

(87) PCT Pub. No.: WO2011/037553
PCT Pub. Date: Mar. 31, 2011

(65) Prior Publication Data
US 2012/0251909 A1    Oct. 4, 2012

(51) Int. Cl.
*H01M 8/04*          (2016.01)
*H01M 8/04291*       (2016.01)
(Continued)

(52) U.S. Cl.
CPC ... *H01M 8/04291* (2013.01); *H01M 8/04134* (2013.01); *H01M 8/04223* (2013.01);
(Continued)

(58) Field of Classification Search
CPC ......... H01M 8/04134; H01M 8/04223; H01M 8/04291; H01M 8/04417; H01M 8/04544;
(Continued)

(56) References Cited

U.S. PATENT DOCUMENTS 4,019,072 A * 4/1977 Mifune et al. ............... 310/317
6,539,794 B1 * 4/2003 Otto ....................... G01F 23/284
                                                   340/621
(Continued)

FOREIGN PATENT DOCUMENTS

JP    11-111315 A     4/1999
JP    11-283645 A    10/1999
(Continued)

OTHER PUBLICATIONS

Senix Corp, "Ultrasonic Sensor with Voltage Output, User's Guide", published 1996.*
(Continued)

*Primary Examiner* — Emily Le
*Assistant Examiner* — Lilia V Nedialkova
(74) *Attorney, Agent, or Firm* — Seed IP Law Group LLP

(57) ABSTRACT

A fluid detection system and method for a fuel cell power plant is disclosed having a pressure sensor (61, 161) positioned in a fuel cell stack assembly (10) to measure pressure of fluid/liquid in a fluid/liquid flow path (40, 42, 44) therein and to provide a pressure-based signal (90, 63). The pressure-based signal (90, 63) is used to control a liquid management arrangement (53) at least during start-up and shut-down of the cell stack assembly (10) to regulate water level. The liquid management arrangement (53) may include means (50, 51) for controllably applying and releasing a vacuum to a water manifold (44, 54; 100) of the cell stack assembly (10) to regulate water flow and level therein. The pressure-based control of water level may extend across the entire operating range of the cell stack assembly (10), or may be complemented during steady state operation by voltage-based sensors (66, 166).

18 Claims, 5 Drawing Sheets

(51) Int. Cl.

| | |
|---|---|
| *H01M 8/04119* | (2016.01) |
| *H01M 8/04223* | (2016.01) |
| *H01M 8/0438* | (2016.01) |
| *H01M 8/04537* | (2016.01) |
| *H01M 8/04828* | (2016.01) |
| *H01M 8/247* | (2016.01) |
| *H01M 8/241* | (2016.01) |
| *H01M 8/1018* | (2016.01) |

(52) U.S. Cl.
CPC ... *H01M 8/04417* (2013.01); *H01M 8/04544* (2013.01); *H01M 8/04828* (2013.01); *H01M 8/247* (2013.01); *H01M 8/241* (2013.01); *H01M 2008/1095* (2013.01)

(58) Field of Classification Search
CPC .. H01M 8/04828; H01M 8/241; H01M 8/247; H01M 2008/1095
See application file for complete search history.

(56) References Cited

U.S. PATENT DOCUMENTS

| | | | |
|---|---|---|---|
| 2007/0115308 A1* | 5/2007 | Hisano et al. | 347/7 |
| 2008/0176117 A1* | 7/2008 | Koike | 429/14 |
| 2009/0119993 A1* | 5/2009 | Neves et al. | 48/197 R |

FOREIGN PATENT DOCUMENTS

| | | |
|---|---|---|
| JP | 2004-327170 A | 11/2004 |
| JP | 2007-59093 A | 3/2007 |
| WO | WO 2006112833 A1 * | 10/2006 |
| WO | WO 2008076107 A1 * | 6/2008 |
| WO | WO 2010/042084 A1 | 4/2010 |

OTHER PUBLICATIONS

International Search Report, mailed Apr. 30, 2010, for International Application No. PCT/US2009/005297, 2 pages.

* cited by examiner

PRESSURE-BASED LIQUID LEVEL DETECTION AND CONTROL FOR A FUEL CELL STACK ASSEMBLY

BACKGROUND

The disclosure relates generally to fuel cells, and more particularly to the management of liquid for a fuel cell power plant. More particularly still, the disclosure relates to liquid level detection and control for a fuel cell stack assembly for a fuel cell power plant.

Fuel cell power plants convert chemical energy into usable electrical power. Fuel cell power plants typically comprise multiple fuel cells arranged to form a fuel cell stack assembly (CSA), including internal ports or external manifolds that connect coolant fluid and reactant gas flow passages or channels. An individual fuel cell in a CSA typically includes an electrolyte, such as a proton exchange membrane (PEM), interposed between an anode catalyst layer (anode) and a cathode catalyst layer (cathode) to form a membrane electrode assembly (MEA). Directly on either side of the MEA are porous gas diffusion layers (GDL) followed by reactant flow field plates that can be of gas permeable porous construction or can be solid with defined channels therein. These plates supply a reactant fuel (e.g. hydrogen) to the anode, and a reactant oxidant (e.g. air or oxygen) to the cathode. Protons formed at the anode are selectively transferred via the membrane (PEM) to the cathode. The electrons formed at the anode serve to produce an external electrical current, and are recombined with protons at the cathode, resulting in the further production of water and thermal energy.

Fuel cell power plants may comprise subsystems for dealing with the management of water and the thermal energy produced. The electrochemical reaction in a fuel cell is more efficient at certain operating temperatures, and overheating can cause drying out of the PEM, which not only hinders or prevents the electrochemical reaction from occurring but also can lead to physical degradation of the membrane itself. Conversely, excessive moisture in the CSA can also lead to performance degradation when product water formed at the cathode, for example, accumulates and blocks reactants from reaching the PEM surface, thus inhibiting the electrochemical reaction.

In order to address the problems of excessive heat, drying, and moisture associated with fuel cells, various systems have been developed for carefully managing the fluid balance in the CSA such that it stays sufficiently cooled and hydrated for maximum stack performance. Regardless of the system used, the coolant fluid, typically a liquid, must be uniformly distributed throughout the CSA via a fluid flow path in order to prevent the formation of thermal gradients and/or to properly humidify the reactants. Consequently, various techniques have been employed in the art to verify whether a proper liquid balance is present in the CSA, including monitoring coolant flow and overall fluid levels. Since the fluid flows and levels of concern herein typically involve a liquid, the term "liquid" will be generally be used hereinafter with respect to that medium of concern, though it will be understood that fluids in gas phase are also present and flow in the CSA.

As an example, in systems where liquid collects in a reservoir, overall liquid presence in the CSA can be measured as a function of a height of a column of liquid in the reservoir by using a float type sensor. However, such sensors are comprised of mechanical parts that are subject to breakage over time, and are further prone to giving false readings under frozen conditions.

Other systems detect the presence of liquid by using a conductivity sensor in contact with the liquid. These systems have the limitation or disadvantage of requiring the generation of a primary signal from either a battery or wire tap off of the external circuit, and thus increase the complexity and/or weight of the system and/or decrease the amount of power available to the primary load.

SUMMARY

In a recent system described in a co-pending application PCT/US2008/011512 entitled Voltage-Based Fluid Sensor for a Fuel Cell Stack Assembly filed 8 Oct. 2008 and commonly-owned with the present application, there is disclosed a fluid detection system for a fuel cell power plant which has at least two sensor elements (electrodes) that are positioned such that a measurable voltage is present between the electrodes only when liquid in a cell stack assembly is in electrical communication with both of the electrodes. The positioning of the electrodes may be used to confirm liquid levels and/or may act to confirm liquid flow. That system does not require a primary signal to be applied to the electrodes from a source external to the CSA, but uses the CSA to generate the primary signal indicating presence or absence or absence of liquid. This avoids some of the limitations discussed above, but is operative only during steady-state operation when the CSA is actually providing a voltage. While such system may suffice during normal steady-state operation, it is important to monitor and/or control liquid levels, particularly coolant levels, in the CSA also during the intervals when the CSA is being started (start-up) and/or being shut down (shut-down) but is not generating an adequately measurable voltage, in order to assure adequate control of coolant even then because the thermal management of the CSA is dependent on an awareness and understanding of the coolant level from initial start up through final shutdown. Indeed, in situations where the CSA may be used as a back-up power supply that is used infrequently, it must periodically be run through test start-up and shut-down phases that may not include a voltage-generating steady-state phase.

The present disclosure relates to a liquid detection system and method for a fuel cell power plant, and particularly to an arrangement for liquid level detection and/or control in a fuel cell stack assembly at least during start-up and shut-down of the CSA. The liquid detection system uses a pressure sensor to measure fluid/liquid pressure/vacuum in the fluid/liquid flow path of a fuel cell stack assembly and provide a signal indicative of liquid level in the cell stack assembly. The pressure-based liquid level signal is used to control liquid flow and/or level at least during start-up and shut-down of the CSA, as when used in conjunction with voltage-based liquid level sensors. The pressure-based liquid level signal may also be used independently, or in conjunction with another type sensor, across the entire operating spectrum, including during steady state operation.

The disclosed liquid detection and level control system operates effectively even when there is no or little detectable CSA voltage present.

The disclosed liquid detection and level control system operates in a safe mode even if the liquid is frozen.

Additionally, use of a pressure-based liquid level sensing arrangement may rely upon a single conventional pressure/vacuum sensor.

DETAILED DESCRIPTION

Following is described a pressure-based system and method for detecting fluid pressure in a fluid/liquid flow path of a fuel cell stack assembly (CSA) as a measure of liquid level, and to thereby control liquid level in the CSA. The disclosure is predicated in part on the determination that fluid pressure, or changes in fluid pressure, in a fluid flow path in the CSA may be used to monitor and/or control actual liquid coolant levels in the CSA not only during steady state operation, but also during start-up and shut-down transitions when other types of level detection systems may be limited. Use of a signal derived from such pressure-based measurements is then used at least during start-up and shut-down transitions to at least augment or possibly replace such other types of level detection systems.

A variety of methods and systems can be used for managing the liquid balance in the CSA such that it stays sufficiently cooled and hydrated for good stack life and performance. As an example, some fuel cell power plants use a coolant loop that is physically separate from the fuel cell operations. In such systems, coolant fluid (e.g., typically water or glycol-based liquid mixtures) is actively circulated throughout the coolant loop by a pump, and is used as a heat sink to receive waste heat conducted through the solid elements or barriers separating the fuel cells from the coolant channels comprising the loop. Such systems may humidify the reactant gases prior to supplying the gas to the fuel cells to prevent membrane dry-out. In other systems, such as the one described with reference to FIG. 1, the reactants are humidified internally with the use of water-permeable separator plates (not shown) with reactant gas flow fields on one side and water coolant channels (i.e., coolant loop) on the other side. In such systems, pressure differentials between the coolant loop and reactant channels facilitate product water from the cathode side to permeate into the coolant channels, and water to permeate from the coolant channels into the reactant passages on the anode side to humidify the reactants. Regardless of which system is used, the coolant must be uniformly distributed through the fuel cell stack in order to prevent the formation of thermal gradients. For internal humidification systems that couple the cooling and humidification functions, a proper water balance not only ensures sufficient cooling but also the proper humidification of reactants.

Figure 1:
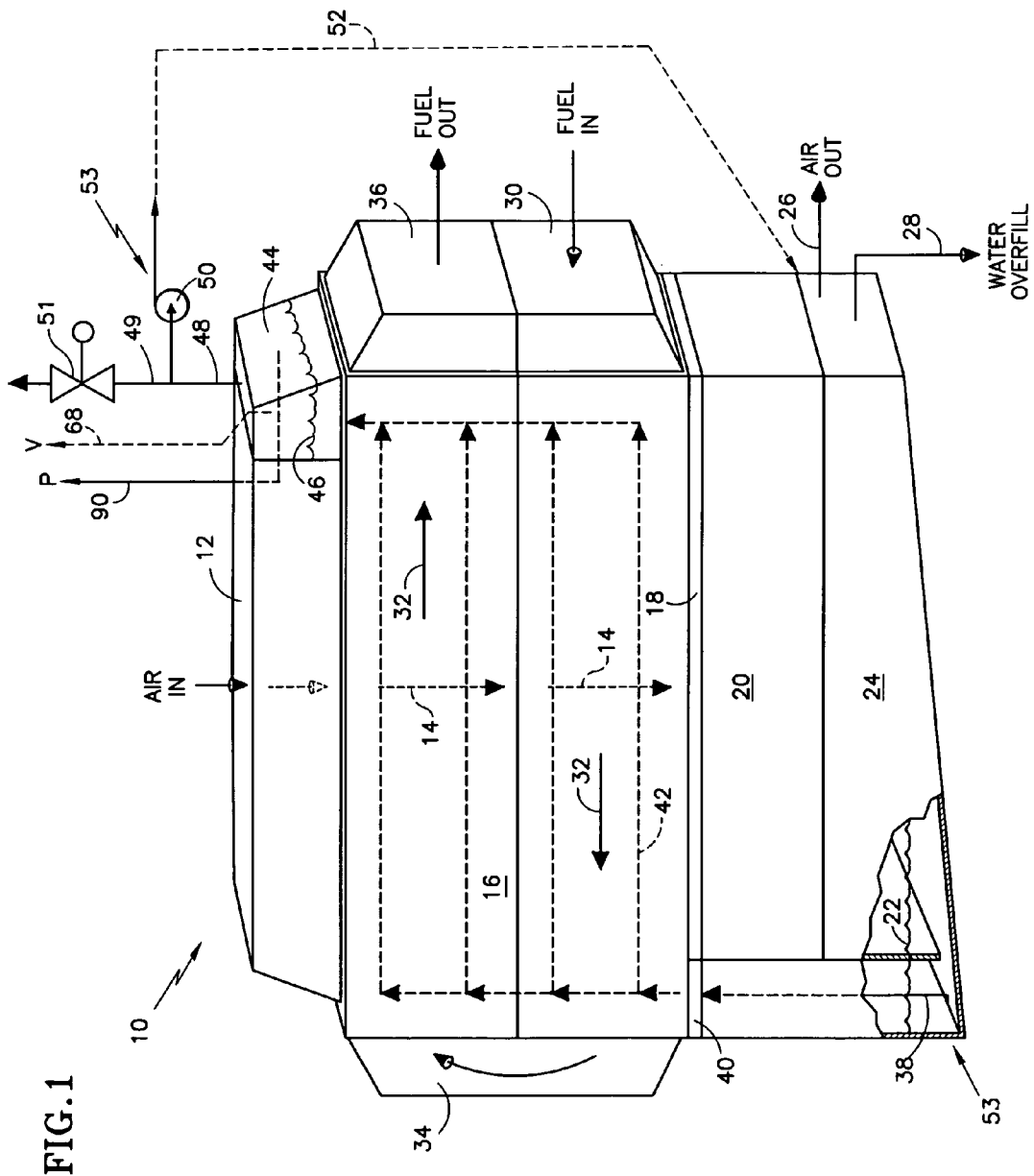
FIG. 1 is a simplified, perspective view of a fuel cell stack assembly, including an embodiment of a pressure-based liquid level sensor of the present disclosure.

FIG. 1 is a simplified, perspective view of CSA 10 having one of many possible reactant flow configurations for air and fuel, and that uses an internal humidification system as described above. Air is provided to air inlet manifold 12 and proceeds through oxidant flow channels 14 (detailed structure not shown) through PEM fuel cell stack ("stack") 16 and into air exit manifold 18. From air exit manifold 18, hot humidified air travels into condenser 20 to cool, which condenses the water vapor in the air into liquid water 22 that is held in reservoir 24. Cooled air is then expelled at air outlet 26, which may also comprise or be adjacent to water overfill outlet 28.

Fuel provided to fuel inlet manifold 30 travels through fuel flow channels 32 (detailed structure not shown) in stack 16, then through fuel turn manifold 34 and back through more fuel flow channels 32 before exiting into fuel exit manifold 36 for recycling or proper disposal as is known in the art.

Water 22 in reservoir 24 flows through water conduit 38 and into water inlet manifold 40. The water then passes into a series of water channels 42 (detailed structure not shown) distributed throughout stack 16. Water channels 42 may terminate at water exit manifold 44, into which a quantity, or level, of water 46 may be present, depending on the operational status of the power plant. Attached to water exit manifold 44 is conduit 48 that provides a fluid communication to pump 50. In systems where evaporative cooling via water vapor in oxidant flow channels 14 is used for managing the temperature of stack 16, as in the embodiments depicted and described herein, water does not exit the CSA conduit 48 or pump 50. Rather, pump 50 is used to draw a controlled vacuum pressure for ensuring that water will rise through all of the water channels 42 of stack 16, with just enough water entering through water inlet manifold 40 to replace that which evaporated into oxidant flow channels 14. In other systems where stack temperature is managed at least in part with circulating water or other fluid, conduit 48 may act as a water outlet, with pump 50 acting to circulate water through conduit 52 into reservoir 24 and eventually back into water channels 42.

In the depicted embodiment in which vacuum pump 50 may be a constant speed device used to control vacuum pressure to draw water through stack 16 and into the water exit manifold 44, there is also provided a vacuum-break conduit 49 and valve 51 extending from the conduit 48 for selectively altering or breaking the vacuum to regulate water level, as will be described. For purposes of the present disclosure, the CSA 10 is viewed as having a fluid flow path for water through the stack 16, which flow path includes the water inlet manifold 40, the water channels 42 and the water exit manifold 44. Moreover, the CSA 10 may be viewed as including a liquid management arrangement, generally designated 53, associated with the water flow path for supplying water to the flow path and for regulating the flow or level therein. This liquid management arrangement 53 not only includes the water inlet manifold 40, the water channels 42 and the water exit manifold 44, but may also include reservoir 24 associated with the water inlet manifold 40 and includes a controllable delivery/exhaust arrangement such as pump 50 and vacuum-break valve 51 associated with the water exit manifold 44.

In further accord with the disclosed system, FIG. 1 depicts, in generalized form, a pressure-based liquid level signal designated "P" appearing on lead 90 in accordance with the present disclosure, and an optional additional voltage-based liquid level signal designated "V" appearing on lead(s) 68. These signals are representative, directly or indirectly, of water levels/quantities in the stack 16 as will be described. It should also be understood that P, as used herein, is typically, though not exclusively, representative of a sub-atmospheric pressure, or vacuum, and has been depicted for convenience in FIG. 4 in a normalized fashion in which an increasing vacuum (decreasing pressure) appears in the positive (upward) direction.

Figure 2:
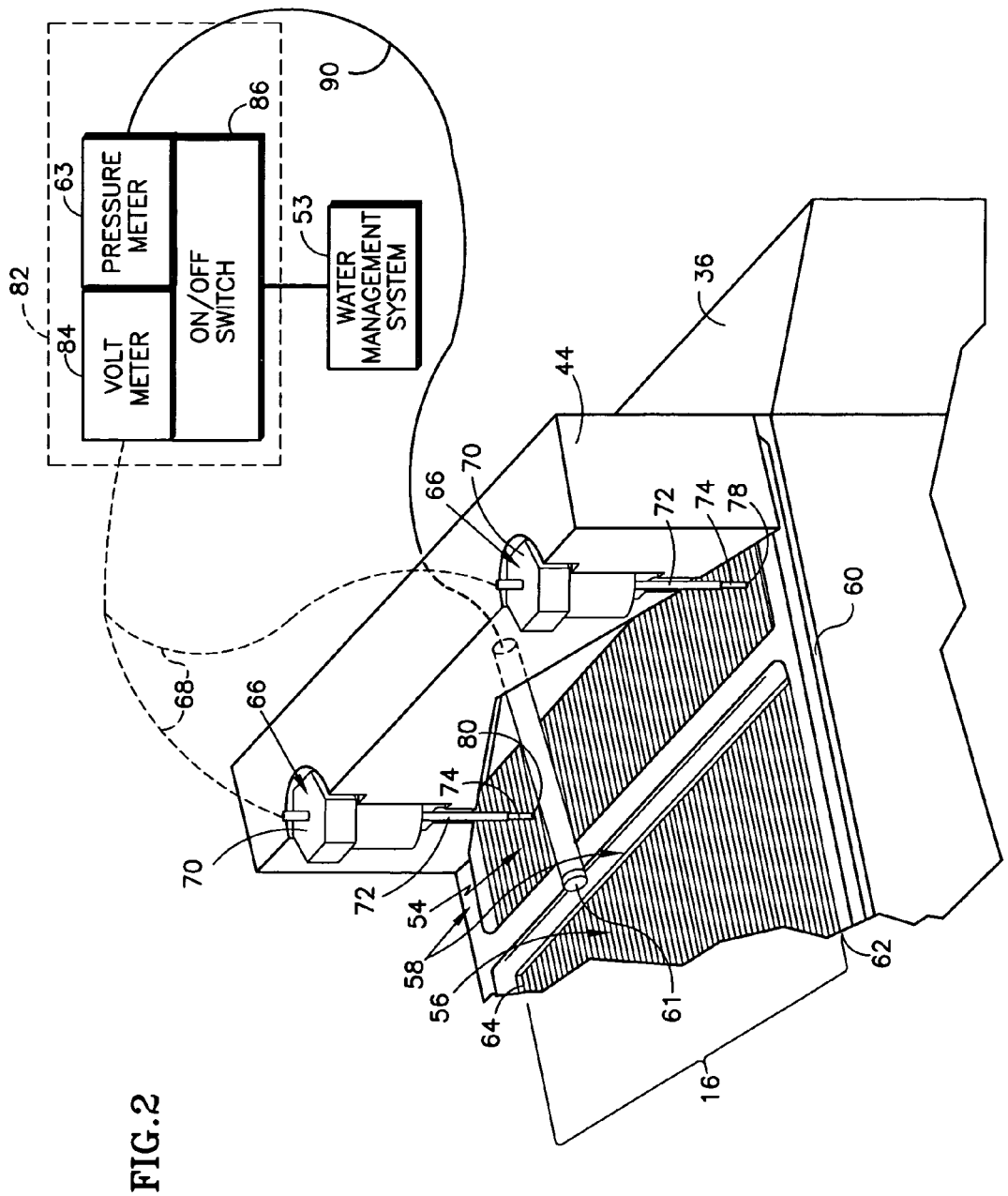
FIG. 2 is a cross-sectional perspective view of the water exit manifold of FIG. 1, showing an embodiment of the present disclosure in greater detail, including a pressure-based sensor, optional voltage-based sensors, and a simplified schematic of the control responsive thereto.

FIG. 2 is a cross-sectional perspective view of the water exit manifold 44 of FIG. 1, showing an embodiment having both a pressure sensor element 61 and optional additional voltage sensor elements 74. As discussed with reference to FIG. 1, water channels 42 eventually terminate in water exit manifold 44. Water exit manifold space 54 is sealed with manifold gaskets 58 to prevent leakage of water into air inlet manifold space 56 and to the external environment. The individual fuel cells of fuel cell stack 16 are shown arranged in an electrical series beneath manifold spaces 54 and 56, and are sandwiched between pressure plates 60 present on opposite sides of stack 16. This arrangement accrues the collective potentials of the individual cells to provide a total combined potential between the anode end 62 and the cathode end 64. The stack 16 may be connected to an external load circuit (not shown) to form a closed circuit that is insulated from other parts of the CSA 10 to prevent short circuiting.

Figure 4:
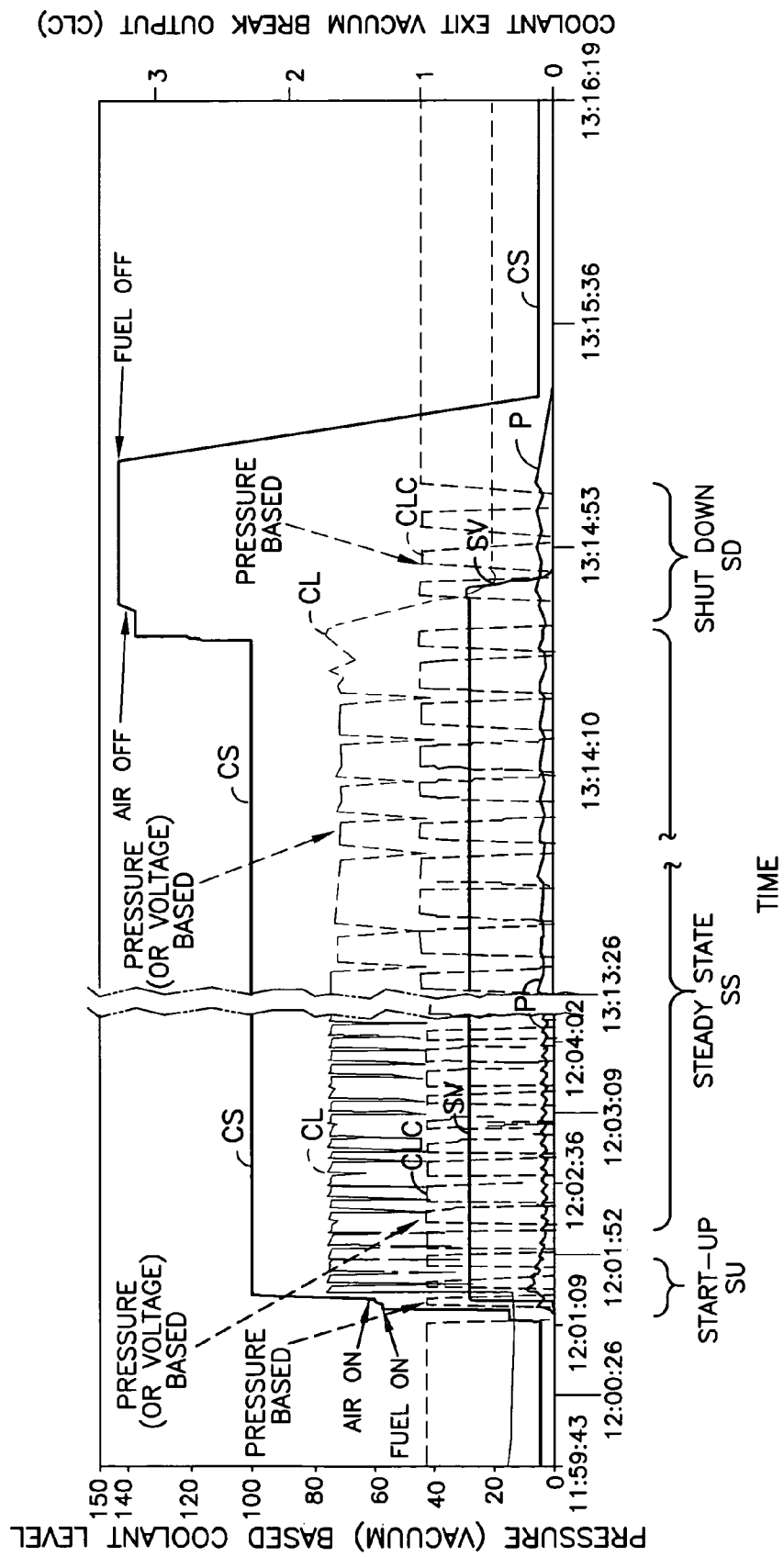
FIG. 4 is a representative composite trace of liquid/coolant level control similar to the start-up and shutdown portions of FIG. 3, but showing the extended control of liquid level based on sensed fluid pressure.

In accordance with the present disclosure, a pressure sensor element 61 is mounted in the stack 16, conveniently in the water exit manifold 44 in communication with the water exit manifold space 54. The pressure sensor element 61 may be of conventional design capable of sensing pressure of a fluid, either liquid, e.g., water, or gas, e.g., air, in the water exit manifold 44, and is mounted through the wall of the water exit manifold 44 in fluid sealed relation therewith, as at the distal end of a mounting stalk. The pressure sensor element 61 in the depicted embodiments is capable of sensing sub-atmospheric pressures normally associated with the vacuum pressures that may be present in water exit manifold 44 and its space 54. The pressure sensor element 61 is positioned in a region of space 54 normally not occupied by water to sense manifold fluid (normally gas) pressure, yet is positioned such that when the coolant liquid (water) rises to a predetermined level in the water exit manifold 44, it contacts the pressure sensor element 61 and causes an abrupt change in the sensed pressure because of the change in fluid medium from gas (air) to liquid (water), as is depicted in FIG. 4 to be described. It is desirable to have the operative portion of the pressure sensor element 61 located in the water exit manifold space 54 at a so-called "neutral" position or location that minimizes variation in the actual water levels detected in the event the fuel cell becomes inclined (tilted), as in a mobile application. Such neutral location exists in the manifold 44 at the geometric point of minimum displacement of coolant liquid for both left/right and fore/aft tilt, and may be identified either empirically or by geometric calculation. A signal-conveying lead 90 extends a sensed pressure signal to processing circuitry of a controller 82 to be described. The pressure existing in water exit manifold 44 is determined by the vacuum pump 53 (FIG. 1) and, to a lesser extent, the resulting level of water/liquid therein, and is sensed by the pressure sensor element 61 to provide a signal for determining the liquid level. The presence of water in water exit manifold 44 is an indication that water is present throughout water channels 42 in stack 16, and the pressure sensor element 61 is located to provide a distinctive indication when the medium at that specific location changes from the gas phase (vacuum) to the liquid phase (coolant), thereby indicating a particular level of coolant water in the manifold. More specifically, whereas the vacuum increases, i.e., the sensed pressure decreases, as the vacuum pump 50 evacuates air from the water exit manifold 44 to draw in coolant water through the CSA, that sensed pressure abruptly changes in the opposite direction when the pressure sensor element 61 is contacted by coolant water rising to the predetermined level in the water exit manifold. It is this change in direction of the sensed pressure that provides the indication that the coolant has reached the predetermined level in the water exit manifold 44.

In further accordance with the embodiment depicted in FIGS. 1 and 2, an optional voltage sensing arrangement is additionally included for use in combination with the pressure sensor element 61. Because it is viewed as an optional addition relative to the pressure sensor, it is depicted in broken lines. The voltage sensing arrangement is generally as described in the aforementioned PCT Application PCT/US2008/011512. Briefly, the voltage sensing arrangement relies upon voltage sensors to sense a small electrical current present in the coolant liquid circulating in the stack 16, when two or more of those sensors are in contact with the liquid. In FIG. 2, two voltage sensor elements 66 are shown, each comprising leads 68 extending through insulative hex cap 70, through electrically insulative sheath 72, and ending in exposed wire electrode portion 74. The two or more voltage sensor elements 66 are relatively spaced, as for example in the direction between the anode end 62 and the cathode end 64 of stack 16, to measure relative potential differences. Moreover, the electrode portions 74 are normally positioned in water exit manifold space 54 such that they are not in contact with water until it reaches some predetermined level to be sensed, typically being the same level as determined by the pressure sensor element 61. As a further possible configuration of/for the voltage sensors, a wire lead (not shown) may be connected between an electrically conductive pressure plate 60 and the controller 82 to provide yet a further voltage sensor element in addition to voltage sensor elements 66. Importantly, the voltage sensor elements 66 are reliant upon the stack 16 being sufficiently operative to provide a stack voltage in order to provide some commensurate voltage-based signal indicative of the presence of a water level.

The controller 82 of FIG. 2 is depicted in diagrammatic form and may be comprised of various known forms of circuitry, including discrete and/or integrated analog and/or digital components. The controller 82 is shown as consisting of a pressure monitoring and responsive device, such as pressure meter 63. In this embodiment, a display of measured pressure on pressure meter 63 could signal to an operator if, and when, a predetermined water level had been attained in water exit manifold space 54, allowing the operator to accordingly adjust the water level in CSA 10 if required. Alternatively and more typically, controller 82 may include appropriate analytical circuitry (not shown in detail, but represented by pressure meter 63) for monitoring the pressure in water exit manifold 44 as the vacuum pump 50 draws, or attempts to draw, coolant water into the exit manifold, which pressure typically changes to reflect an increasing vacuum, and then for noting the abrupt transition in the direction of that pressure change as the coolant water contacts the pressure sensor element 61. The abrupt transition in the direction of that pressure change indicates the coolant water having reached the predetermined level, and the circuitry of pressure meter 63 serves to control an on/off switch 86 which in turn is operably connected to liquid management arrangement 53, thus allowing the automated control of water level balance in CSA 10 as will be described. The controller 82 further includes the capability of determining a subsequent event, such as a time interval or attainment of a specific pressure threshold, for toggling the on/off switch 86 to its alternate state. The circuitry of pressure meter 63 may also include a safety pressure threshold for preventing the vacuum pressure in water exit manifold 44 from exceeding a critical pressure that would otherwise allow unwanted gas-crossover within the CSA 10, as will also be described. Optionally, the controller 82 may additionally include a voltmeter 84 connected via leads 68 with the voltage sensor elements 66, and which functions similarly to the pressure meter 63 in that it provides a signal indicative of the relative presence or absence of water in water exit manifold space 54, and may also be connected to on/off switch 86 to facilitate water level control via the liquid management arrangement 53.

Figure 3:
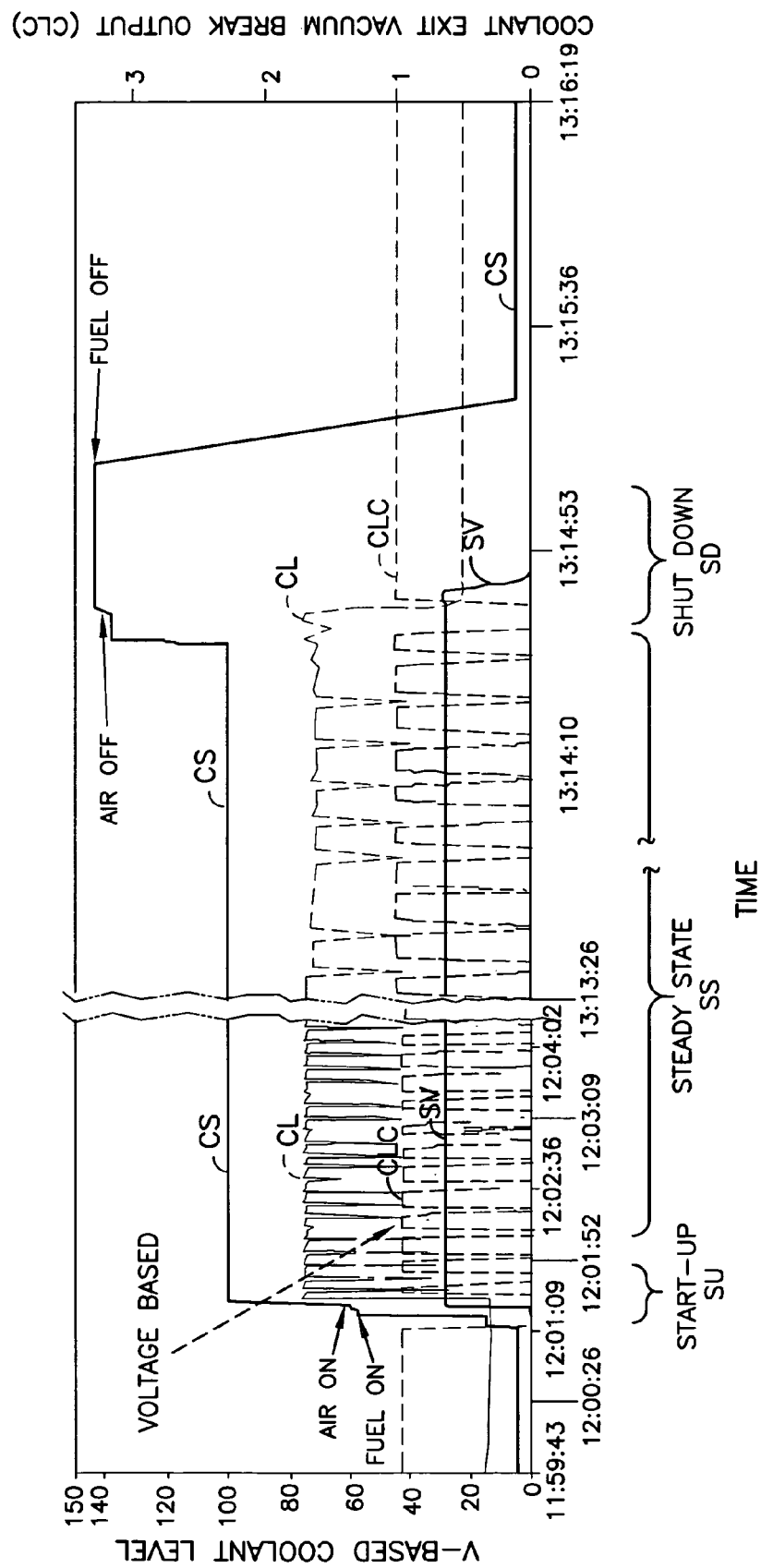
FIG. 3 is a representative composite trace of liquid/coolant level control based only on voltage during start-up, steady-state, and shut-down states of operation.

Prior to a further discussion of the manner in which pressure sensor element 61, and optionally also voltage sensor elements 66, operate(s) to regulate water level in water exit manifold space 54, it is instructive to view and consider time-based traces of several parameters associated with the operation of the CSA 10. Referring first to FIG. 3, there is illustrated a representative composite trace depicting liquid/coolant level control during start-up, steady-state, and shut-down states of operation of the CSA 10, based only on control by a voltage-based coolant level control signal as described in the aforementioned PCT Application PCT/US2008/011512. An arbitrary, illustrative time base is noted in hours, minutes, and seconds for an example 1.25 hour operation of the CSA 10, that begins with start-up at about 12:01:09 and completes shut-down at approximately 13:15:20. The parameters monitored and/or depicted include the controller state CS of the master controller (not separately shown) for the CSA 10, the actual stack voltage output SV of stack 16, the actual level of coolant CL in the water exit manifold space 54, and a coolant level control signal CLC for regulating coolant level. The coolant level control signal CLC serves in any of several different ways through the liquid management arrangement 53 to regulate the supply of water to the water exit manifold space 54. For instance, it may typically be of binary nature (1 or 0) and serve to supply water, as for example by activating a solenoid valve to allow water to flow from a source, or by turning on (and off) a pump that delivers the water either by positive pressure or by vacuum, or by actuating a vacuum-break solenoid associated with a constantly-running vacuum pump (as in the embodiment of FIG. 1). It is to be noted in FIG. 3 that since the coolant level control signal CLC is derived only from sensing a voltage-based measure of water level, it exists only during steady state operation SS when the stack voltage SV exists, and does not exist during the important transition intervals of start-up SU (shown as about 15 seconds) and shut-down SD (shown as about 20-25 seconds). During these transition intervals it continues to be important to attain and/or maintain an appropriate control mechanism for coolant level control in the water exit manifold space 54 because the thermal management of the CSA is dependent on an awareness and understanding of the coolant level from initial start up to final shutdown.

Reference is made now to the traces of FIG. 4, which correspond to the embodiment(s) depicted in FIGS. 1 and 2. Here, a fluid pressure P in water exit manifold 44 is sensed by pressure sensor element 61, and is used, directly or indirectly, to provide the coolant level control signal CLC at least during the start-up SU and shut-down SD intervals, and may serve to provide that signal also during steady state operation SS of the CSA 10. Optionally and alternatively, during the steady state portion SS of operation of the CSA 10, the coolant level control signal CLC may be derived from sensing a voltage-based measure of coolant level in the water exit manifold space 54, as by voltage sensor elements 66, with the coolant exit fluid pressure signal P from the water exit manifold 44 serving to provide the CLC signal during start-up SU and shut-down SD. In this latter option, the controller 82 would normally look to the pressure-based signal from pressure sensor element 61 at pressure meter 63 as providing the CLC signal, but would substitute the voltage-based signal from voltage sensor elements 66 at voltmeter 84 upon the CSA 10 attaining steady state operation. These transitions may be determined automatically, as for example by the appearance/existence of stack voltage SV serving to enable usage of the signal from voltage sensor elements 66, or perhaps based upon predetermined time intervals allocated to initiation of start-up SU and initiation of shut-down SD.

Brief consideration is now given to the manner in which the controller 82 and the water management system 53 regulate the water level in water exit manifold space 54. The master controller (not shown, but see "state" signal CS) serves to initiate start-up by turning on the vacuum pump 50 to draw water/coolant through the stack 16, then turns on the fuel supply and shortly thereafter turns on the air supply. The pressure signal P from the pressure sensor element 61 reflects the sensed vacuum pressure in the water exit manifold space 54, and has been depicted for convenience in FIG. 4 in a normalized fashion in which an increasing vacuum (decreasing pressure) appears in the positive (upward) direction. The vacuum pressure P is shown as increasing as the water level presumably increases until the water contacts the pressure sensor element 61 at the predetermined level commensurate with desired coolant level CL. When the coolant water has risen sufficiently to contact the pressure sensor element 61, that sensor no longer detects gas (vacuum) pressure but the pressure of the coolant water, which is relatively greater but is depicted as less in the normalized portrayal of pressure P in FIG. 4. At that point, the pressure signal P experiences a change in direction that is determined by controller 82 and pressure meter 63 circuitry to represent the coolant water having reached the predetermined water level. The controller acts via on/off switch 86 to provide the CLC signal, which may be binary in nature. The CLC signal is extended to the vacuum break valve 51, causing the valve to open when that desired water level threshold has been reached. This "breaks" the vacuum in lines 48 and 49 from pump 50, thus also reducing the force drawing coolant/water through the stack 16 and into the water exit manifold space 54. The absence of the vacuum in the water exit manifold space 54 allows the water level to begin to drop and the pressure in that space experiences a gradual pressure rise (depicted as a decline in trace P of FIG. 4). This continues either for a predetermined interval of time or until the pressure reaches some predetermined value, whereupon the CLC signal moves (toggles) to the opposite state at which the vacuum-break valve 51 again closes and the fill cycle begins anew. This process can be seen generally in FIG. 3 without reliance on a pressure measurement, and particularly in FIG. 4 where use of the sensed pressure P during the start-up SU and shut-down SD phases results in regulation of the coolant level in the water exit manifold space 54 during those phases as well.

A notable benefit of a system of water level control based on sensed pressure/vacuum to provide the CLC signal, especially during start-up, as contrasted with sensed voltage providing that signal, exists because of the desire/need to prevent gas cross-over resulting from a pressure differential exceeding the so-called bubble pressure of the stack 16. If that critical bubble pressure were to be exceeded, gases within the system may cross otherwise impenetrable barriers with undesirable consequences. If one assumes a coolant water flow-blocking condition, such as a start-up from a frozen condition in the system, the pressure-based CLC signal will repeatedly apply the vacuum of pump 50 and the vacuum will increase (a pressure decrease) until the vacuum-break valve 51 opens at the predetermined safe threshold, and the cycle is safely repeated.

Figure 5:
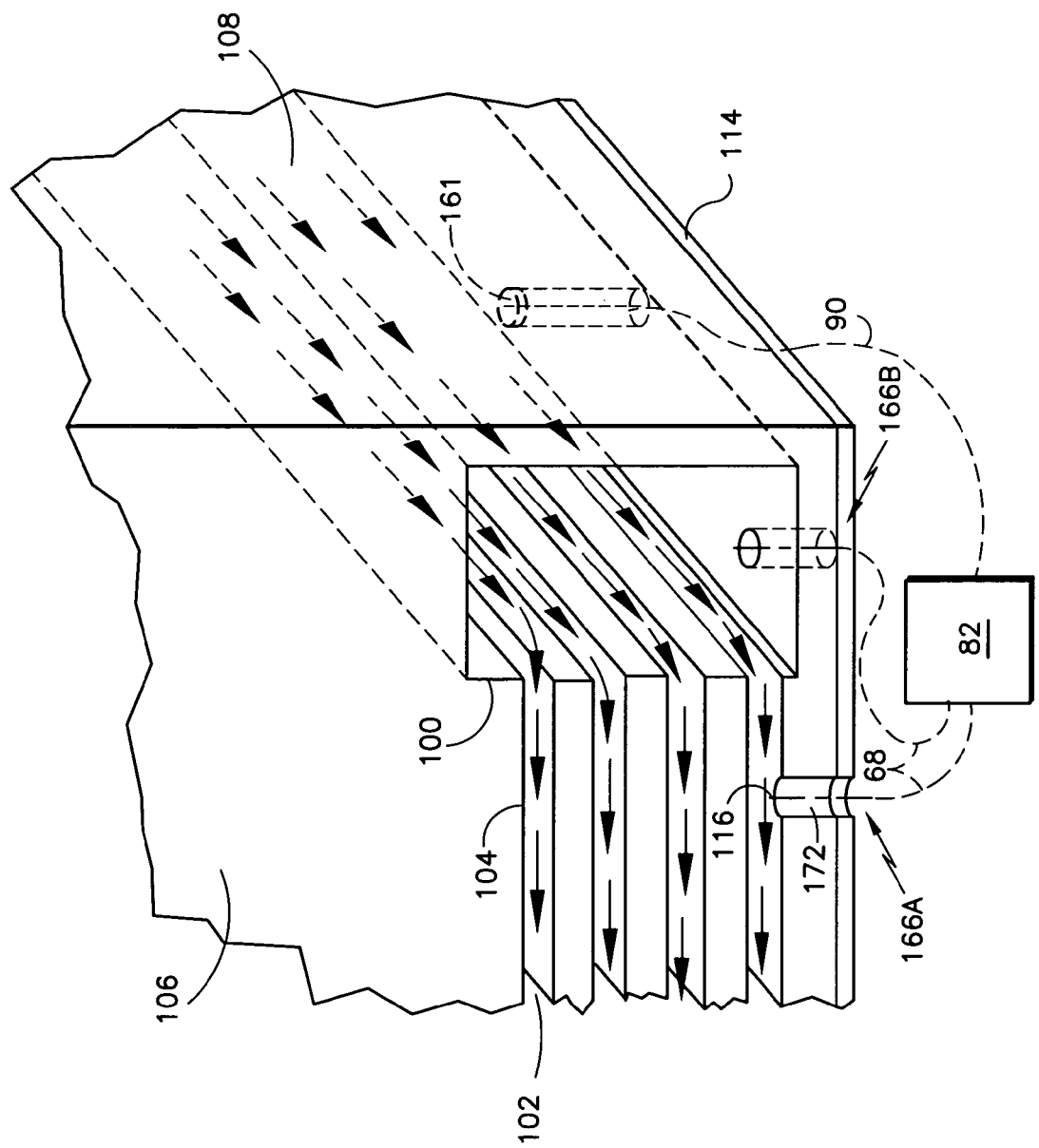
FIG. 5 is a simplified cross-sectional perspective view of an enlarged portion of an internal manifold system of a CSA, and including an embodiment of a pressure-based liquid level sensor of the present disclosure.

Although the embodiments of the present disclosure thus far have been generally discussed with reference to the system shown in FIGS. 1 and 2 having external manifolds, the present disclosure may be practiced in internally manifolded systems as well. FIG. 5 is a simplified cross-sectional perspective view of a portion of a typical internal manifold system of a CSA having internal manifolds 100 for the transport of fluid through fluid channels 102 as known in the art. A hypothetical flow of fluid, such as water or glycol-based coolant, is also shown, both through water transport plates 106 and through internal manifold spaces 108. Pressure sensor element 161 is similar in structure to the pressure sensor disclosed with respect to the FIGS. 1 and 2 embodiment, and is suitably mounted to sense the pressure of fluids, and particularly coolant liquids such as water, in the internal manifold spaces 108. In this sense, internal manifold space 108 is analogous to the water exit manifold 44 of FIGS. 1 and 2. Pressure sensor element 161 should be sealed within wall 114 such that leakage of fluid from manifold space(s) 108 and fluid channel(s) 102 into the external environment cannot occur. As discussed with respect to the embodiment associated with an external water exit manifold, the operative portion of the pressure sensor element 161 is positioned at a "neutral" location selected to minimize variation in detected predetermined coolant levels that might otherwise be caused by tilt of the fuel cell. A lead 90 operably connects the pressure sensor element 161 to the controller 82 described earlier. Similarly, assuming optional additional voltage-based coolant level control is desired, a voltage sensor element 166A is shown in cross-section, comprising an insulative housing 172 positioned to penetrate through wall 114, with wire lead terminating in electrode 116 in the flow path of fluid channel 102. Housing 172 may comprise any electrically insulative material as is known in the art, and should be sealed within wall 114 such that leakage of fluid from fluid channel 102 into the external environment cannot occur. Voltage sensor element 166B is shown comprising the same components as sensor element 166A, but instead of electrode 172 positioned in the path of fluid channel 102, it is positioned in the path of internal manifold space 108. Sensor elements 166A and 1666 are operably connected to controller 82, as described with reference to FIG. 2.

Although the disclosure has been described and illustrated with respect to the exemplary embodiments thereof, it should be understood by those skilled in the art that the foregoing and various other changes, omissions and additions may be made without departing from the spirit and scope of the disclosure. For example, it will be understood that multiple, spaced pressure sensor elements may be used to accommodate for variations in actual water levels that may result from inclination or tilt of the fuel cell. All such modifications and variations are intended to be included herein within the scope of this disclosure and protected by the accompanying claims.

What is claimed is:

1. A liquid-level control system for a fuel cell power plant, the system comprising:
    a fuel cell stack assembly, including a fluid flow path extending therethrough;
    a controllable liquid management arrangement operatively connected to the fuel cell stack assembly and including said fluid flow path;
    a pressure sensor adapted to sense pressure of fluid in the fluid flow path of the fuel cell stack assembly and provide a fluid pressure signal commensurate therewith; and
    a voltage sensing arrangement adapted to measure a voltage when a liquid in the fluid flow path of the cell stack assembly attains a predetermined level and provide a voltage-based signal indicative thereof, and
    the liquid management arrangement being operably connected to and at least indirectly responsive to the fluid pressure signal, the liquid management arrangement being configured to regulate a level of liquid in the fuel cell stack assembly based on the fluid pressure signal at least during start-up and during shut-down of the fuel cell stack assembly, and when the fuel cell stack assembly does not provide a measurable voltage, and
    the liquid management arrangement being operably connected to and at least indirectly responsive to the voltage-based signal, the liquid management arrangement being configured to regulate the level of liquid in the fuel cell stack assembly based on the voltage-based signal at least during steady state operation of the fuel cell stack assembly and when the fuel cell stack assembly provides a measurable voltage, and
    the liquid management arrangement configured to automatically transition from regulating the level of liquid in the fuel cell stack assembly based on the fluid pressure signal to regulating the level of liquid in the fuel cell stack assembly based on the voltage-based signal when the fuel cell stack assembly provides a measurable voltage, and configured to automatically transition from regulating the level of liquid in the fuel cell stack assembly based on the voltage-based signal to regulating the level of liquid in the fuel cell stack assembly based on the fluid pressure signal when the fuel cell stack assembly does not provide a measurable voltage.

2. The liquid-level control system for a fuel cell power plant of claim 1, comprising:
    the liquid management arrangement being responsive at least indirectly to the fluid pressure signal additionally during normal steady state operation of the fuel cell stack assembly to regulate the level of the liquid in the fuel cell stack assembly.

3. The liquid-level control system for a fuel cell power plant of claim 1, wherein:
    the fuel cell stack assembly comprises a proton exchange membrane fuel cell stack, and temperature of the fuel cell stack assembly is controlled by evaporative cooling in the fuel cell stack assembly.

4. The liquid-level control system for a fuel cell power plant of claim 1, further including:

a controller operably connected to and responsive to the fluid pressure signal to determine attainment of a predetermined level of liquid in the fuel cell stack assembly, said controller being operably connected to said controllable liquid management arrangement to regulate the level of liquid in the fuel cell stack assembly at least during said start-up and said shut-down of the fuel cell stack assembly.

5. The liquid-level control system for a fuel cell power plant of claim 4, wherein:
the fluid flow path extending through the fuel cell stack assembly is for water and includes a water exit manifold,
a vacuum pump is operatively connected to the water exit manifold of the fluid flow path to create a vacuum therein,
the pressure sensor is operatively positioned in said water exit manifold to sense vacuum pressure in said water exit manifold until water contacts said pressure sensor at said predetermined level in the water exit manifold and to sense water pressure when water contacts said pressure sensor, there being a distinctive inflection in the sensed pressure at the transition from sensed vacuum to sensed water pressure, and
said controller is responsive to said distinctive inflection in the sensed pressure to signal that said water has attained said predetermined level.

6. The liquid-level control system for a fuel cell power plant of claim 5, wherein:
the vacuum is effectively removed from the liquid flow path in response to said controller signaling that said water has attained said predetermined level and is restored in response to a subsequent measured event, thereby to maintain a desired range of liquid level in the fuel cell stack assembly.

7. The liquid-level control system for a fuel cell power plant of claim 6, wherein:
said subsequent measured event for restoring the vacuum is the lapse of a predetermined time interval.

8. The liquid-level control system for a fuel cell power plant of claim 1 wherein the pressure sensor is positioned at a neutral location that minimizes measurement variation as the fuel cell stack assembly tilts.

9. The liquid level control system for a fuel cell power plant of claim 1 wherein the pressure sensor is positioned at a neutral location that minimizes measurement variation as the fuel cell stack assembly tilts about two independent axes.

10. A liquid-level control system for a fuel cell power plant, the system comprising:
a fuel cell stack assembly, including a fluid flow path extending therethrough for water, the fluid flow path including a water exit manifold;
a controllable liquid management arrangement operatively connected to the fuel cell stack assembly and including said fluid flow path;
a pressure sensor adapted to sense pressure of fluid in the fluid flow path of the fuel cell stack assembly and provide a fluid pressure signal commensurate therewith, and wherein the fluid pressure signal is operably connected to the liquid management arrangement such that the liquid management arrangement is configured to regulate a level of water in the fuel cell stack assembly based on the fluid pressure signal only during start-up and during shut-down of the fuel cell stack assembly and when the fuel cell stack assembly does not provide a measurable voltage; and
a voltage sensing arrangement adapted to measure a voltage when water in the fluid flow path attains a predetermined level in the water exit manifold and provide a voltage-based signal indicative thereof, and wherein the voltage-based signal indicative of the water attaining said predetermined level is also operably connected to the liquid management arrangement such that the liquid management arrangement is configured to regulate the level of water in the fuel cell stack assembly based on the voltage-based signal only during steady state operation of the fuel cell stack assembly and when the fuel cell stack assembly provides a measurable voltage, and
the liquid management arrangement configured to automatically transition from regulating the level of liquid in the fuel cell stack assembly based on the fluid pressure signal to regulating the level of liquid in the fuel cell stack assembly based on the voltage-based signal when the fuel cell stack assembly provides a measurable voltage, and configured to automatically transition from regulating the level of liquid in the fuel cell stack assembly based on the voltage-based signal to regulating the level of liquid in the fuel cell stack assembly based on the fluid pressure signal when the fuel cell stack assembly does not provide a measurable voltage.

11. The system of claim 10 wherein the pressure sensor is operatively positioned in said water exit manifold to sense vacuum pressure in said water exit manifold until water contacts said pressure sensor at said predetermined level in the water exit manifold and to sense water pressure when water contacts said pressure sensor, there being a distinctive inflection in the sensed pressure at the transition from sensed vacuum to sensed water pressure.

12. A method of controlling a liquid level in a fuel cell power plant comprising a liquid level control system, a fuel cell stack assembly including a fluid flow path extending therethrough, a controllable liquid management arrangement operatively connected to the fuel cell stack assembly and including said fluid flow path, a pressure sensor adapted to sense pressure of fluid in the fluid flow path of the fuel cell stack assembly and provide a fluid pressure signal commensurate therewith, a voltage sensing arrangement adapted to measure a voltage when a liquid in the fluid flow path of the fuel cell stack assembly attains a predetermined level and provide a voltage-based signal indicative thereof, the liquid management arrangement being operably connected to and at least indirectly responsive to the fluid pressure signal, the liquid management arrangement being configured to regulate a level of liquid in the fuel cell stack assembly at least during start-up and during shut-down of the fuel cell stack assembly based on the fluid pressure signal, and the liquid management arrangement being operably connected to and at least indirectly responsive to the voltage-based signal, the liquid management arrangement being configured to regulate the level of liquid in the fuel cell stack assembly at least during steady state operation of the fuel cell stack assembly based on the voltage-based signal, the method comprising:
sensing pressure of fluid in the fluid flow path of the fuel cell stack assembly to provide the fluid pressure signal indicative thereof;
regulating the level of liquid in the fuel cell stack assembly based at least in part on the fluid pressure signal at least during start-up and during shut-down of the fuel cell stack assembly and when the fuel cell stack assembly does not provide a measurable voltage;

measuring the voltage to ascertain when the liquid in the fluid flow path of the fuel cell stack assembly reaches the predetermined level to provide the voltage-based signal indicative thereof; and regulating the level of the liquid in the fuel cell stack assembly based at least in part on the voltage-based signal at least during steady state operation of the fuel cell stack assembly and when the fuel cell stack assembly provides a measurable voltage, and automatically transitioning from regulating the level of liquid in the fuel cell stack assembly based at least in part on the fluid pressure signal to regulating the level of liquid in the fuel cell stack assembly based at least in part on the voltage-based signal when the fuel cell stack assembly provides a measurable voltage.

13. The method of claim 12 wherein the fuel cell stack assembly comprises a proton exchange membrane fuel cell stack and the method further comprises controlling temperature of the fuel cell stack assembly by evaporative cooling in the proton exchange membrane fuel cell stack.

14. The method of claim 12 wherein sensing the pressure of fluid in the fluid flow path of the fuel cell stack assembly includes sensing vacuum pressure in a water exit manifold of the fuel cell stack assembly with the pressure sensor until water contacts said pressure sensor at a predetermined level in the water exit manifold and sensing water pressure when water contacts said pressure sensor, there being a distinctive inflection in the sensed pressure at the transition from sensed vacuum to sensed water pressure.

15. The method of claim 14 wherein regulating the level of liquid in the fuel cell stack assembly at least during start-up and during shut-down of the fuel cell stack assembly based at least in part on the fluid pressure signal includes regulating the level of liquid in the fuel cell stack assembly based at least in part on the distinctive inflection in the sensed pressure.

16. The method of claim 14 wherein regulating the level of liquid in the fuel cell stack assembly includes effectively removing the vacuum from the liquid flow path in response to said water attaining said predetermined level and restoring the vacuum in response to a subsequent measured event.

17. The method of claim 16 wherein said subsequent measured event for restoring the vacuum is the lapse of a predetermined time interval.

18. The method of claim 12 wherein measuring the voltage to ascertain when the liquid in the fluid flow path of the fuel cell stack assembly reaches the predetermined level includes measuring voltage when water within a water exit manifold of the fuel cell stack assembly reaches the predetermined level.

* * * * *